C. T. LITCHFIELD & R. BOEKLEN.
Wood Screws.
No. 161,528. Patented March 30, 1875.
Fig. 1. Fig. 3. Fig. 4.
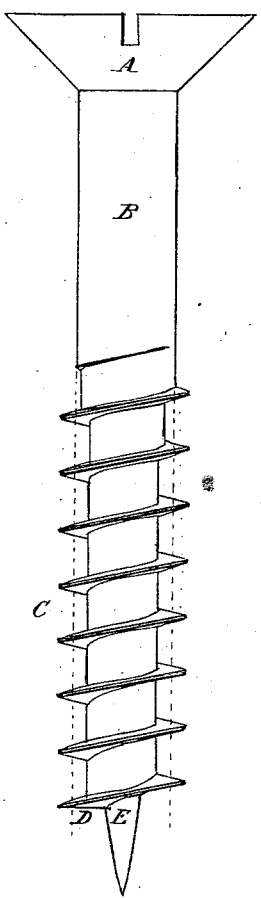 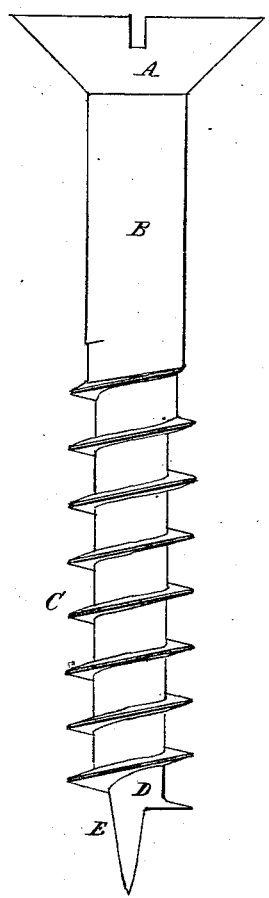 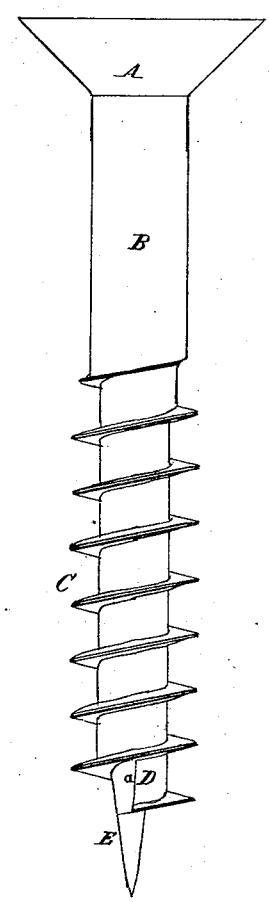
Fig. 2.
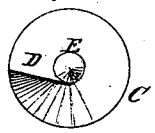
Witnesses.
Inventors.
Chas. T. Litchfield
Reinhold Boeklen

UNITED STATES PATENT OFFICE.

CHARLES T. LITCHFIELD AND REINHOLD BOEKLEN, OF BROOKLYN, N. Y.

IMPROVEMENT IN WOOD-SCREWS.

Specification forming part of Letters Patent No. 161,528, dated March 30, 1875; application filed March 20, 1875.

*To all whom it may concern:*

Be it known that we, CHAS. T. LITCHFIELD and REINHOLD BOEKLEN, both of the city of Brooklyn, in the county of Kings and State of New York, have invented certain new and useful Improvements in Wood-Screws; and we do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to a wood-screw having a screw-thread, the outer periphery of which is raised above the shank or diameter of the wire of which the screw is made, and of which the bottom or inner periphery is pressed below, or of a smaller diameter than that of the shank or wire it is made from.

By this means when the screw is used to secure two pieces of wood together, the shank is fitted in the wood tightly without splitting the same, and without requiring a hole to be made in the wood for the shank.

A screw of this description can be made by rolling the screw-thread upon it; consequently the same can be made at less expense than the cut screw, and at the same time is stronger and less liable to breakage by torsion.

In the annexed drawings, Figure 1 represents a side elevation of the screw made according to our invention. Fig. 2 is a bottom view of the same, and Figs. 3 and 4 are elevations of the same.

In Fig. 3 the screw is turned to exhibit a face view of the entering portion of the threaded part, and in Fig. 4 the screw is turned to show an edge view of said entering portion.

A represents the head of the screw, which is of the ordinary form. B represents the shank or unthreaded portion of the screw, the diameter of which is left unchanged from that of the wire of which the screw is made. C represents the threaded portion of the screw, and D the commencement or entering portion of the same. E represents the point or entering extremity of the screw.

The bottom or inner periphery of the threaded portion C is depressed or made smaller in diameter than that of the shank B, while the outer periphery of the screw thread or threaded portion is raised to a greater diameter than that of the shank, as is clearly shown in Fig. 1 by dotted lines, the object of which is to cause the shank to enter easily and still tightly fit the wood without splitting the same, and at the same time avoid the necessity of boring a hole in the wood for it.

The screw, with a shank and threaded portion with relative diameters, as above described, can be threaded by rolling and pressing, which process is less expensive than that of cutting the threads, as now generally practiced, and the screw is made stiffer, harder, and stronger, and consequently less liable to bend and break than the cut screw.

The point E is made tapering, or similar to the point of a center-bit, in order to enter the wood with little pressure. It is concentric, and its base follows the first turn of the screw-thread on its lower side, as shown. The object is to locate the screw properly with facility, and to guide and keep the location of the screw, and prevent it from following softer or easier entering portions of the wood, and also to prevent the screw from turning eccentrically into the wood, and making therein a larger hole than is required for its threaded portion. At the lower portion of the thread, and the upper part of the point E, a sharp corner or edge is formed at D, having its outer edge formed upon a vertical line, or slightly inclined, as shown at *a*, Fig. 4.

The screw-thread is continuous, of uniform radius, and of equal pitch or spirality throughout its entire length, and terminates on the conical point of the screw at the longitudinal shoulder *a* in a broad radial blade or edge, thus differing from the screw described in an application which is still pending before the United States Patent Office, filed March 12, 1873, in which the thread commences to narrow or diminish in radius from the point where it enters on the conical point at its base, and continues to diminish gradually until it finally vanishes altogether at a point on the cone-point a considerable distance beyond or below the longitudinal cutting-shoulder.

Having thus fully described our invention, what we claim, and desire to secure by Letters Patent, is—

The improved wood-screw herein described and shown, the same having a reduced threaded body, C, and a thread of equal radius—greater than that of the shank B—and of equal pitch or spirality throughout its entire length, terminating on the conical point of the screw in a broad radial blade or edge, and having also (starting from said terminal points of the thread) a cutting-shoulder, $a$, extending longitudinally along the body of the screw upward to the next convolution of the thread, for the purpose herein described.

In testimony that we claim the foregoing we have hereunto set our hands this 27th day of January, 1873.

CHAS. T. LITCHFIELD.
REINHOLD BOEKLEN.

Witnesses:
C. W. HER,
CHAS. REGNAULT.